(12) United States Patent
Botros (10) Patent No.: US 8,498,986 B1
(45) Date of Patent: Jul. 30, 2013

(54) CLASSIFYING DATA USING MACHINE LEARNING

(75) Inventor: Sherif Botros, Palo Alto, CA (US)

(73) Assignee: Business Objects Software Ltd., Dublin (IE)

( * ) Notice: Subject to any disclaimer, the term of this patent is extended or adjusted under 35 U.S.C. 154(b) by 0 days.

(21) Appl. No.: 13/362,598

(22) Filed: Jan. 31, 2012

(51) Int. Cl.
*G06F 17/30* (2006.01)

(52) U.S. Cl.
USPC .......................................................... 707/737

(58) Field of Classification Search
USPC ...................... 707/705, 737; 705/14; 709/223
See application file for complete search history.

(56) References Cited

U.S. PATENT DOCUMENTS

| 8,095,521 | B2 * | 1/2012 | Chan et al. | 707/705 |
| 2003/0208399 | A1 * | 11/2003 | Basak et al. | 705/14 |

OTHER PUBLICATIONS

Princeton University "What is WordNet?" 2011 (3 pages).

* cited by examiner

*Primary Examiner* — Etienne Leroux
(74) *Attorney, Agent, or Firm* — Fish & Richardson P.C.

(57) ABSTRACT

Techniques for data classification include receiving, at a local computing system, a query from a remote computing system, the query comprising data associated with a commodity, the data comprising one or more attributes of the commodity; matching the one or more attributes of the commodity with one or more terms of a plurality of terms in a word matrix that includes a plurality of nodes that each include a term of the plurality of terms and a plurality of links that each connect two or more nodes and define a similarity between the two or more nodes; generating, based on the matching, a numerical vector for the business enterprise commodity; identifying one or more classification regions that each define a classification of the commodity; and preparing the classifications for display at the remote computing system.

20 Claims, 7 Drawing Sheets

CLASSIFYING DATA USING MACHINE LEARNING

TECHNICAL BACKGROUND

This disclosure relates to classifying data and, more particularly, classifying data using an adaptive learning machine.

BACKGROUND

A piece of data can be classified by assigning the data into one or more categories of a given number of categories. For example, goods and services can be classified into categories that are represented by category codes by assigning data that represent the goods and services into one or more categories. To classify a good or service, a textual description of the good or service may be converted into a corresponding category code. In some instances, business enterprises may find it helpful to classify purchases by categories of goods and services. Moreover, some business enterprises may find it helpful for such goods and services to be rated, e.g., for quality or otherwise. Given the very large numbers of goods and services, and more so categories of such goods and services, determining which category a particular good or service falls into, if any, may be difficult.

SUMMARY

This disclosure describes systems, methods, apparatus, and computer-readable media for classifying data, such as data that represent commodities, using an adaptive learning machine including, for example, the features of receiving, at a local computing system, a query from a business enterprise computing system, the query including data associated with a business enterprise commodity, the data including one or more attributes of the business enterprise commodity; matching the one or more attributes of the business enterprise commodity with one or more terms of a plurality of terms in a word matrix, the word matrix including: a plurality of nodes that each include a term of the plurality of terms; and a plurality of links that each connect two or more nodes and define a similarity between the two or more nodes; generating, based on the matching, a numerical vector for the business enterprise commodity; identifying, based on the numerical vector, one or more classification regions that each define a classification of the business enterprise commodity; and preparing the classifications of the business enterprise commodity of the one or more identified classification regions for display at the business enterprise computing system.

A first aspect combinable with any of the general embodiments includes receiving a set of terms, each term of the set of terms is labeled with a correct classification; matching the one or more attributes of the business enterprise commodity with one or more terms of the set of terms; generating the numerical vector based on matching the one or more attributes of the business enterprise commodity with one or more terms of the plurality of terms in the word matrix and one or more terms of the set of terms; identifying one or more classifications of the business enterprise commodity based on the numerical vector; and preparing the one or more classifications of the business enterprise commodity for display at the business enterprise computing system.

A second aspect combinable with any of the previous aspects further includes prior to receiving the query from the business enterprise computing system, building the word matrix.

In a third aspect combinable with any of the previous aspects, building the word matrix includes searching for content associated with a plurality of business enterprise commodities; parsing the content into the plurality of terms to define the plurality of nodes; and applying a semantic proximity model to the plurality of terms to define the plurality of links, wherein a link that connects two or more nodes defines a semantic similarity between the two or more nodes.

In a fourth aspect combinable with any of the previous aspects, building the word matrix further includes applying a string similarity model to map a term of the plurality of terms into a similar term, wherein a link that connects two or more nodes defines a string similarity between the two or more nodes.

In a fifth aspect combinable with any of the previous aspects, the classification is defined by a first classification level in a plurality of classification levels defined in a classification hierarchy.

In a sixth aspect combinable with any of the previous aspects, the plurality of classification levels include a segment classification level, a family classification level, a class classification level, a commodity classification level, and a business function classification level.

In a seventh aspect combinable with any of the previous aspects, the classification includes the commodity classification level.

An eighth aspect combinable with any of the previous aspects further includes transmitting the classifications of the business enterprise commodity of the one or more identified classification regions for display at the business enterprise computing system; receiving a selection of one of the classifications of the business enterprise commodity from the business enterprise computing system; and updating the word matrix based on the received selection.

In a ninth aspect combinable with any of the previous aspects, updating the word matrix based on the received selection includes creating a direct link between the nodes including terms matching the one or more attributes.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

Particular embodiments of the subject matter described in this disclosure can be implemented so as to realize none, one, or more of the following advantages. An adaptive learning machine for classifying data can convert textual descriptions into corresponding category codes where the textual descriptions are unstructured or contain very few terms, or the terms in the textual descriptions are abbreviated or misspelled. The adaptive learning machine may use an external corpus of text documents to augment the set of labeled data. The external corpus of text documents is used in an unsupervised way to derive string similarities and/or semantic similarities. These similarity models are then used by the adaptive learning machine together with labeled data to build classification models. The classification models can be extended for classifying data that is represented by textual descriptions in different languages by using a multi-language external corpus of text documents to derive word similarities. Moreover, the use of an un-labeled external corpus of text documents reduces the need for costly labeled data.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DETAILED DESCRIPTION

In a general embodiment of the present disclosure, an adaptive learning machine uses unsupervised learning and supervised learning to classify data. The data represents an entity, such as a person, place, thing, data record, word, or the like. For unsupervised learning, the adaptive learning machine uses an external corpus of text documents to build a word matrix. The word matrix is a term-to-term similarity matrix generated using semantic similarity and/or string similarity derived from an external corpus of text documents. The word matrix includes nodes and links. A node contains a term, and a link connects two or more nodes and defines a semantic proximity or a string similarity between the terms in the linked nodes. For supervised learning, the adaptive learning machine receives a set of terms that have been labeled with the correct classifications. The adaptive learning machine uses the word matrix, the set of labeled terms, and/or additional attributes associated with the data to classify the data.

In some embodiments, the adaptive learning machine receives a query that includes data that describes, for example, attributes of a commodity, from a client and assigns the attributes of the commodity to one or more classifications using the word matrix, the set of labeled terms, and/or additional attributes associated with the commodity. The adaptive learning machine assigns the attributes of the commodity to one or more classifications by, for example, matching the attributes of the commodity with one or more terms in the word matrix or the set of labeled terms. Based on the matching, the adaptive learning machine determines a classification of the commodity. After the adaptive learning machine determines the classification, the adaptive learning machine prepares the classification of the commodity for display at the client.

Figure 1:
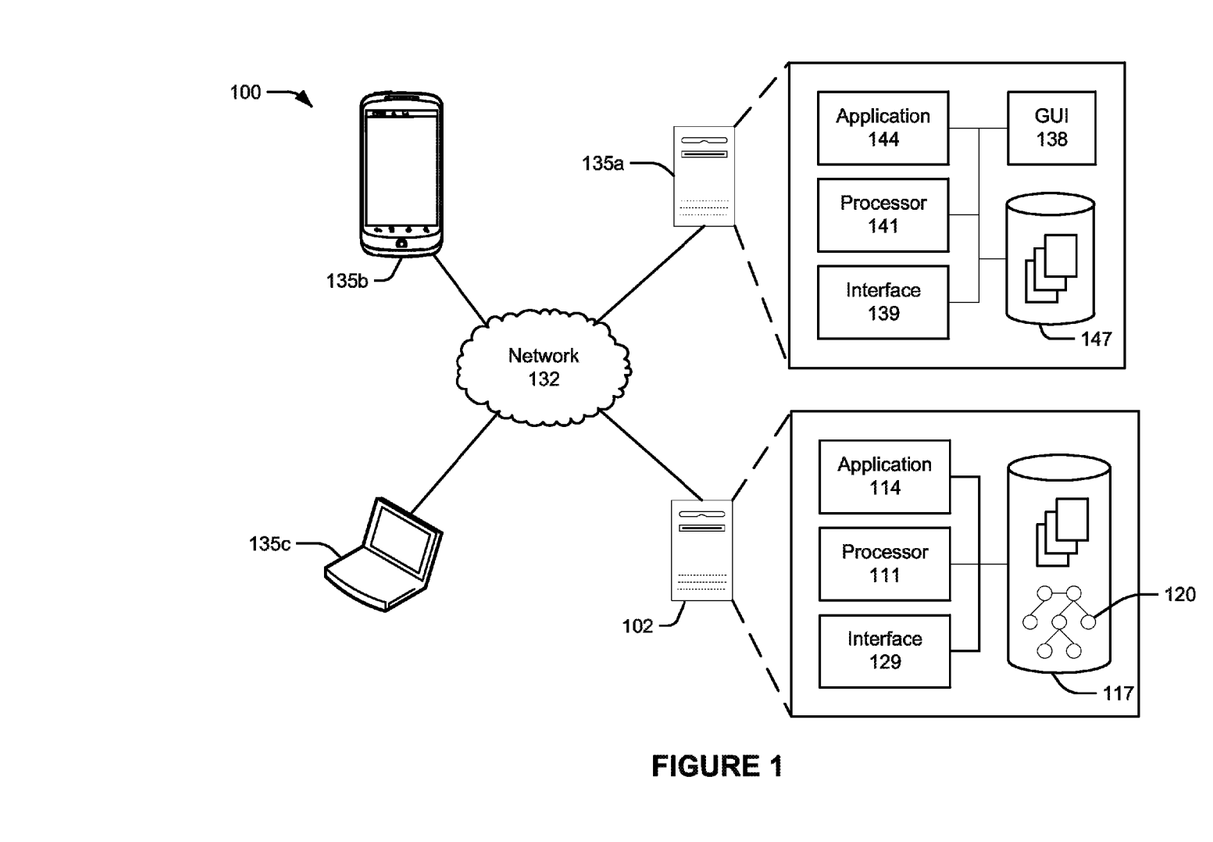
FIG. 1 illustrates an example distributed computing system operable to classify commodities using an adaptive learning machine.

FIG. 1 illustrates an example distributed computing system 100 operable to classify data using an adaptive learning machine 102. In some embodiments, the adaptive learning machine 102 employs supervised learning. In some embodiments, the adaptive learning machine 102 employs unsupervised learning. In some embodiments, the adaptive learning machine 102 includes a support vector machine (SVM) that analyzes data and recognizes patterns, and may be used for classification and regression analysis. For example, the adaptive learning machine 102 may receive inputs and predict, for each given input, which of two possible classes includes the input. In other words, the adaptive learning machine 102 as an SVM may be a classifier that provides a binary output (e.g., tool passage or no tool passage). Typically, a support vector machine constructs a point, line, plane, or hyperplane in a one, two, three, four or higher (including infinite) dimensional space to act as a classifier or model. The line may be replaced with a curve or a set of lines or curves, the plane with a manifold or set of planes or manifolds, and the hyperplane with a set of hyperplanes, which can be used for classification, regression, or other tasks such as ranking and anomaly detection. In general, the adaptive learning machine builds classification and regression models using a set of labeled data. However, in cases where labeled data are costly, the adaptive learning machine can be configured to learn in a semi-supervised way, from a small set of labeled data and a much larger set of unlabeled data.

Turning to the example implementation of FIG. 1, the illustrated environment 100 includes or is communicably coupled with the adaptive learning machine 102 and one or more clients 135, at least some of which communicate across network 132. In general, environment 100 depicts an example configuration of a system capable of providing stateful execution of stateless applications in a substantially transparent way, as well as dynamically determining the particular application's mode of operation in response to requests from its clients 135.

In general, the adaptive learning machine 102 may be a server that stores one or more hosted applications 114, where at least a portion of the hosted applications 114 are executed via requests and responses sent to users or clients within and communicably coupled to the illustrated environment 100 of FIG. 1. An example of a hosted application 114 is a data classification application based on adaptive learning. An example of a data classification application is a commodity classification application. The commodity classification application is executed by the adaptive learning machine 102 to receive queries that describe attributes of commodities from remote clients 135, identify a classification of the commodity, and prepare the classification for display at a client 135 in response to the query.

In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure.

Still further, portions of the hosted application 114 may be executed by a user working directly at server 102, as well as remotely at client 135.

The illustrated server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store a word matrix 120 that includes nodes containing terms and links defining a semantic proximity and/or string similarity between terms in the linked nodes. The memory 117 may store a set of terms labeled with the correct classification that is received from a user of the server 102. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a (e.g., an enterprise client system), each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1. It will be understood that there may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 including a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
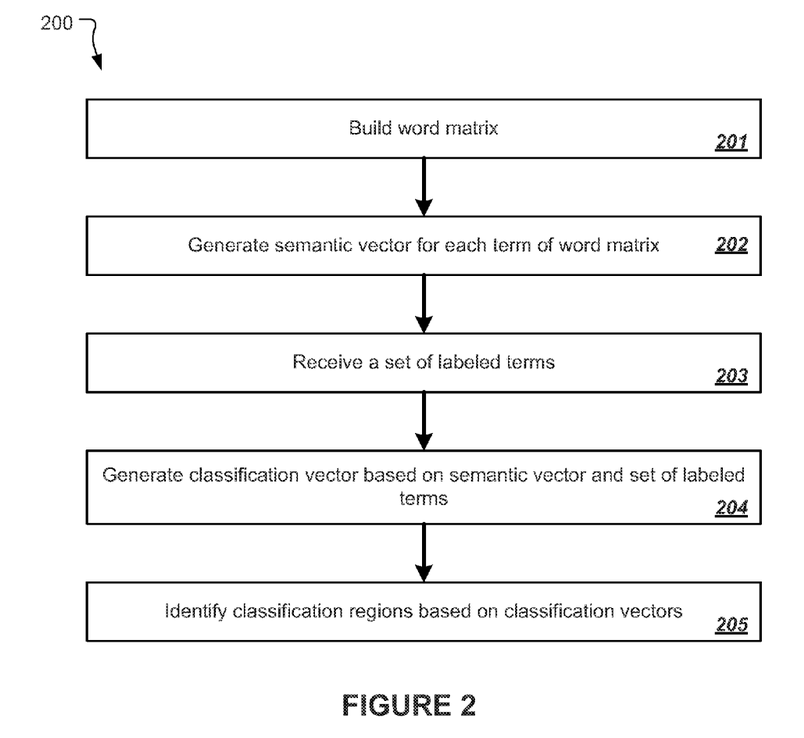
FIG. 2 illustrates an example flowchart for building a classification model for classifying commodities using an adaptive learning machine.

FIG. 2 illustrates an example flowchart 200 for building a classification model for classifying data, such as data representing commodities, using an adaptive learning machine. Without loss of generality, the commodity in flowchart 200 can be replaced with another entity, such as a person, place, data record, word, and the like. The adaptive learning machine can be a system of one or more computers that perform the process 200. For purposes of illustration, the process 200 will be described with respect to a computing system that includes an adaptive learning machine, e.g., the adaptive learning machine 102 of FIG. 1, that performs the process 200.

Figure 3:
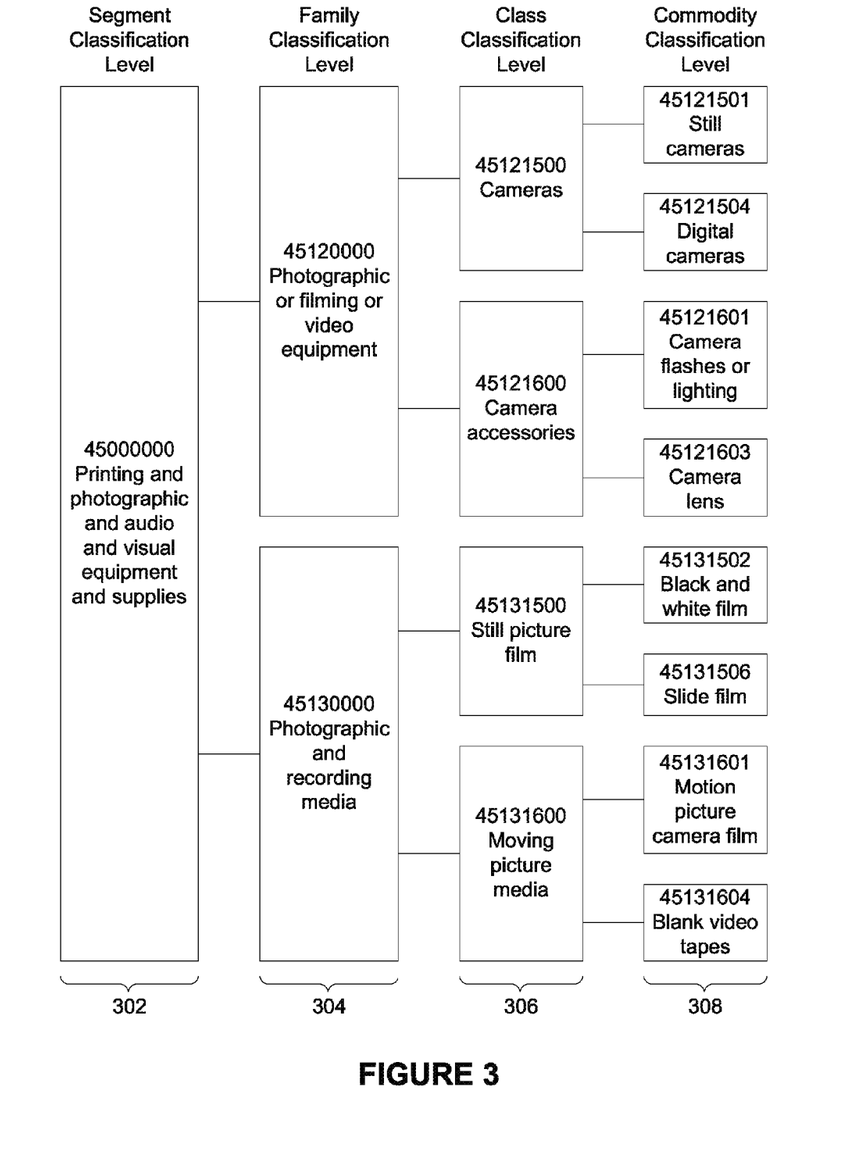
FIG. 3 illustrates an example classification system hierarchy.

To build a classification model for classifying commodities, the adaptive learning machine uses a classification system. FIG. 3 illustrates example classifications, categories, and category codes of a classification system that has a hierarchical structure, such as the United Nations Standard Products and Services Code (UNSPSC), the World Customs Organization Harmonized Commodity Description and Coding System, or the United Nations Standard International Trade Classification (SITC). As shown in FIG. 3, the classification system may have multiple classification levels. The classification levels include, for example, a segment classification level 302, a family classification level 304, a class classification level 306, a commodity classification level 308, and a business function classification level (not shown). Each classification level can include multiple categories, and each category has a corresponding category code. Alternatively, the classification system may include any number of levels different from that shown in FIG. 3.

Figure 4:
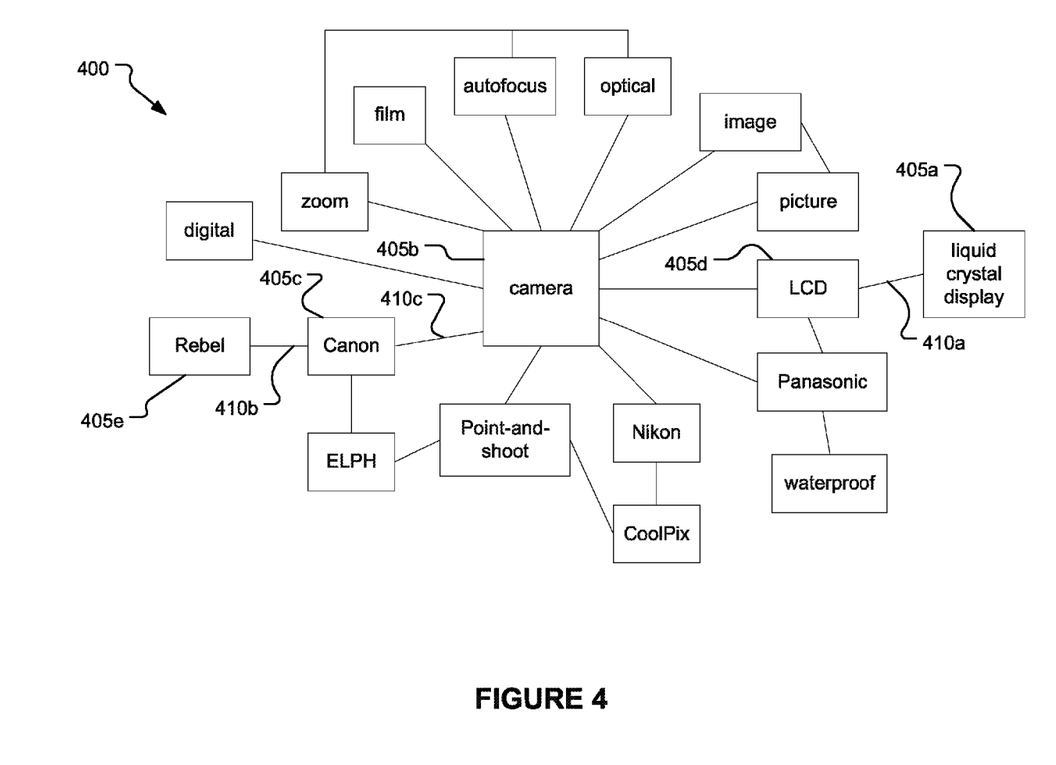
FIG. 4 illustrates an example word matrix.

Referring again to FIG. 2, the adaptive learning machine builds a word matrix at step 201. Turning briefly to FIG. 4, an example word matrix 400 is illustrated. The illustrated word matrix 400 is built on the term "camera." The word matrix 400 includes nodes 405 and links 410. Each node 405 of the word matrix 400 contains a term. Each link 410 connects two or more nodes 405 and defines a semantic proximity or a string similarity between the nodes 405 connected by the link 410. For example, link 410a defines a string similarity between nodes 405a and 405d, and link 410b defines a semantic similarity between nodes 405c and 405e.

To determine the nodes 405 and the links 410 of the word matrix 400, the adaptive learning machine searches for content associated with commodities. For example, the adaptive learning machine uses a thesaurus to identify semantically related terms. From a thesaurus (for example), the adaptive learning machine determines that the words "image" and "picture" in FIG. 4 are semantically related, even though the words are different. Additionally or alternatively, the adaptive learning machine uses an unsupervised model trained on a large corpus of text documents, such as product catalogs, encyclopedias, and other suitable publications, to find correlation between words. The adaptive learning machine parses the product catalogs and encyclopedias into terms. The terms that tend to occur frequently in proximity of each other in sentences or that tend to occur in similar contexts are used to define the nodes 405 of the word matrix 400. Terms that tend to occur frequently in proximity of each other may be, for example, "laptop computer." Terms that tend to occur in similar contexts may be, for example, "book" and "manual" from the sentences "I read a manual" and "I read a book." In this case, the terms "manual" and "book" occur in context with the term "read." For the example word matrix of FIG. 4, from product catalogs, the adaptive learning machine can determine that the terms "Canon" and "Nikon" are associated with digital cameras.

The adaptive learning machine, in some embodiments, applies a semantic proximity model to the terms to define the links 410 between the nodes 405. Because product descriptions are sometimes abbreviated or misspelled, the adaptive learning machine can use string similarity to map a term into a similar term. The adaptive learning machine can combine string similarity and semantic similarity techniques to generate the word matrix 400. The word matrix 400 can be generated for classifying commodities that are described using different languages. In this case, the links 410 connect nodes 405 containing semantically related terms in different languages.

In some instances, the adaptive learning machine determines similarity scores between nodes of the word matrix based on the number of links between nodes. For example, the adaptive learning machine determines similarity scores from a number of links between the nodes that contain terms associated with a commodity. In some instances, the adaptive learning machine determines similarity scores between nodes of the word matrix based on the number of unique paths. For example, in the word matrix of FIG. 4, the adaptive learning machine determines a similarity score between the terms "autofocus" and "picture" from the number of unique paths between the nodes that contain the terms "autofocus" and "picture." Alternatively (or additionally), the adaptive learning machine may determine similarity scores between nodes based on a combination (e.g., weighted) of the number of links between the nodes and the number of unique paths.

Referring again to FIG. 2, the adaptive learning machine generates a semantic vector for each term of the word matrix, at step 202. The adaptive learning machine maps each term of the word matrix to a set of numbers representing that term. The semantic vector has the property such that similar textual descriptions will tend to have similar vectors. For example, the terms "ampicillin" and "tetramycin" may have similar vectors because both terms describe an antibiotic. On the other hand, textual descriptions of different commodities will tend to have different vectors. For example, the term "book" can be mapped to a semantic vector [0.3 0.01 0 0.65 . . . 0.105], the term "manual" can be mapped to a semantic vector [0.41 0.0001 0.02 0.4 . . . 0.20], and the term "dog" can be mapped to a semantic vector [0.001 0.2 0.1 0.02 . . . 0.01]. In this case, the numerical representation of the terms "book" and "manual" are similar, but different from the numerical representation of the term "dog."

By generating a semantic vector for each term, the adaptive learning machine can use the word matrix to convert a textual description of a commodity into a semantic vector. For example, the adaptive learning machine can use the similarity scores to convert the textual description of the commodity into the semantic vector. The semantic vector can be a high dimensional vector representation (e.g., a few hundred numbers) of the textual description of the commodity.

The adaptive learning machine receives a set of terms that have been labeled with the correct classifications from a user of the adaptive learning machine, at step 203. The adaptive learning machine can receive additional information related to commodities, such as vendor information, a name of a company that manufactures the commodity, an industry code, price, weight, or dimensions. For example, the adaptive learning may receive the set of terms "a Lenovo T510 laptop computer, 16 GB RAM, 200 GB disk" and the corresponding classification of "computing device."

The adaptive learning machine generates a classification vector that represents the commodity description, at step 204. The adaptive learning machine combines the semantic vector for each term of the commodity description generated from the word matrix with additional dimensions that represent additional properties of the commodity (e.g., the set of labeled terms, and/or the additional information) to generate the classification vector that represents the commodity description. The classification vector is associated with the correct classification that was received from the user.

Figure 5:
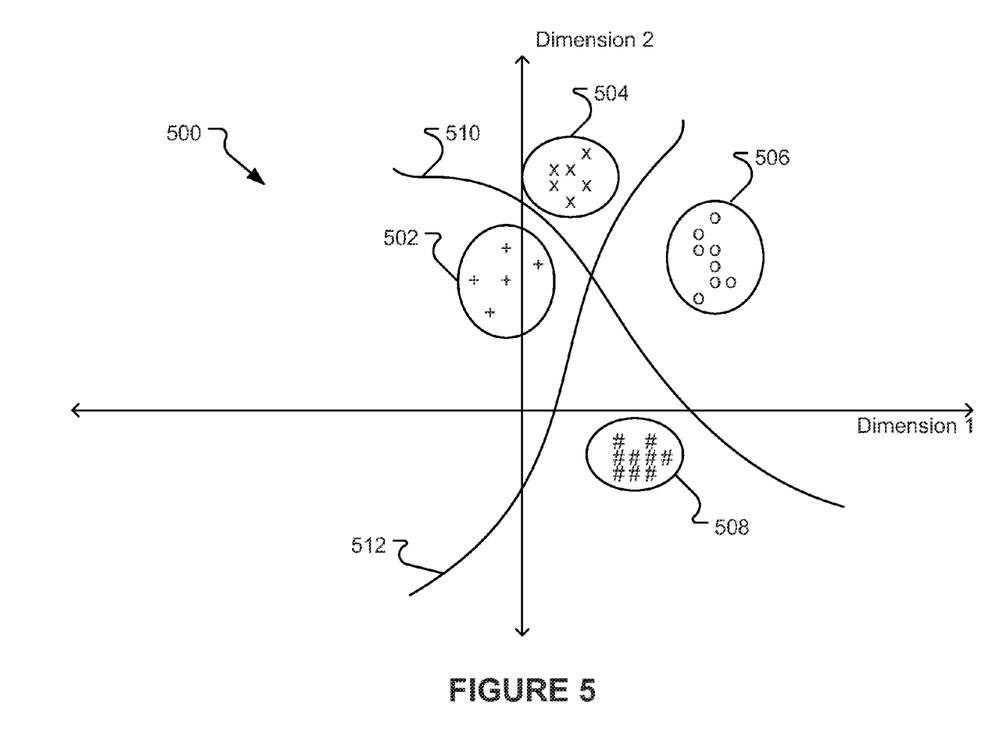
FIG. 5 illustrates an example graphical representation of a classification model.

The classification vectors of a classification model can be represented graphically. FIG. 5 illustrates an example graphical representation of a classification model 500. For simplicity, the classification vectors of FIG. 5 include two numbers for a two dimensional graphical representation. The classification model 500 of FIG. 5 includes four groups of classification vectors 502, 504, 506, 508. Each classification vector in a group is associated with the same classification. For example, group 502 includes classification vectors associated with the classification "cameras." Group 504 includes classification vectors associated with the classification "electronic components." Group 506 includes classification vectors associated with the classification "computers." Group 508 includes classification vectors associated with the classification "antibiotics."

Referring again to FIG. 2, from the groups of classification vectors, the adaptive learning machine identifies classification regions corresponding to different classifications, at step 205. For example, to identify the classification regions in the example classification model 500 of FIG. 5, the adaptive learning machine identifies decision surfaces 510, 512 that separate the vector space into different classifications. The adaptive learning machine can include a support vector machine that identifies the decision surfaces 510, 512. The decision surfaces 510, 512 divide the vector space of the classification model 500 into regions, with each region corresponding to a classification. The regions can correspond to classifications at any classification level. To classify a commodity using the classification model 500, the adaptive learning machine identifies the classification by identifying the classification region associated with a vector representing the commodity.

Figure 6:
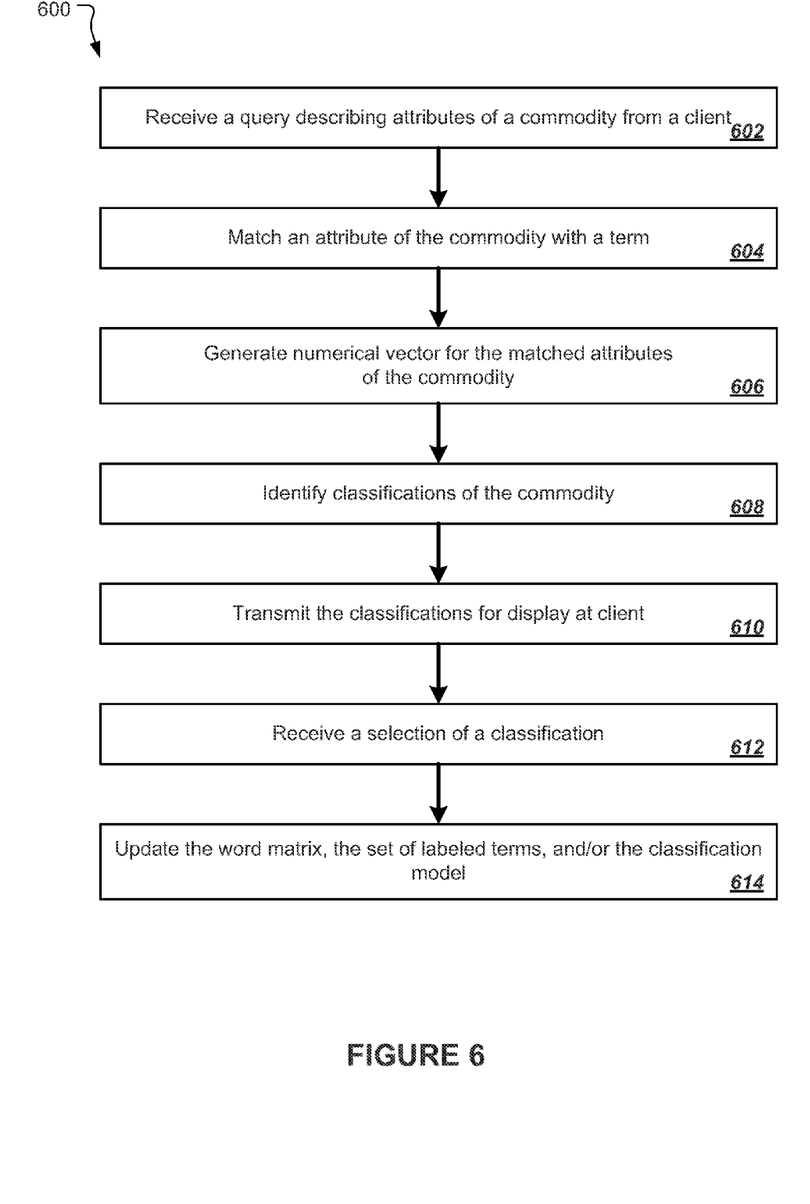
FIG. 6 illustrates an example flowchart for classifying commodities using a classification model.

FIG. 6 illustrates an example flowchart 600 for classifying commodities using, for example, the classification model 500 of FIG. 5. Without loss of generality, the commodity in flowchart 600 can be replaced with another entity, such as a person, place, data record, word, and the like. For purposes of illustration, the process 600 will be described with respect to a computing system that includes an adaptive learning machine, e.g., the adaptive learning machine 102 of FIG. 1, that performs the process 600 and a remote client, e.g., clients 135 of FIG. 1.

The adaptive learning machine receives a query from a client, e.g., a business enterprise computing system, at step 602. The query includes data associated with a commodity. The data includes one or more attributes of the commodity. For example, the adaptive learning machine receives a query for "Canon EOS 12.2 MP CMOS Digital SLR." The attributes of the commodity are the terms in the query, such as "Canon," "EOS," "12.2 MP," "CMOS," "Digital," and "SLR."

At step 604, the adaptive learning machine matches one or more attributes of the commodity with one or more terms in a word matrix and/or one or more terms in a set of labeled terms. For the example query "Canon EOS 12.2 MP CMOS Digital SLR," the adaptive learning machine searches a word matrix, such as word matrix 400 shown in FIG. 4, for terms that match the attributes "Canon," "EOS," "12.2 MP," "CMOS," "Digital," and "SLR." Using word matrix 400, the adaptive learning machine matches the attributes "Canon" and "digital" in the query to the terms "Canon" and "digital" in the word matrix 400. In some instances, the adaptive learning machine searches a set of labeled terms for terms that match the attributes "Canon," "EOS," "12.2 MP," "CMOS," "Digital," and "SLR." For example, the set of labeled terms can include the term "SLR." The adaptive learning machine matches the attribute "SLR" in the query with the term "SLR" in the set of labeled terms. The adaptive learning machine can use suitable matching techniques, such as fuzzy matching to account for misspelled words. In fuzzy matching, the adaptive learning machine will search for terms that approximately match the attributes of the commodity.

Referring again to FIG. 6, the adaptive learning machine generates a numerical vector that represents the matched attributes of the commodity, at step 606. The adaptive learning machine generates the numerical vector based on the attributes matched to terms in the word matrix and the attributes matched to terms in the set of labeled terms. For example, each term in the word matrix is associated with a semantic vector, and the adaptive learning machine identifies the semantic vector associated with the term in the word matrix that matches an attribute of the commodity. The adaptive learning machine can combine the semantic vector with additional dimensions that represent the attributes of the commodity that matched terms in the set of labeled terms to generate the numerical vector.

The adaptive learning machine identifies one or more classifications of the commodity, at step 608. The adaptive learning machine identifies one or more classifications based on the numerical vector corresponding to the attributes of the commodity. For example, the adaptive learning machine identifies a classification region of a classification model, e.g., the classification model 500 of FIG. 5, that is associated with the numerical vector. The classification associated with the identified classification region is the most likely classification of the commodity. For the example classification model 500 of FIG. 5, the adaptive learning machine identifies the classification region associated with the classification "cameras" as the classification that most likely corresponds to the commodity. Based on a classification system, e.g., the classification system shown in FIG. 3, the adaptive learning model determines that the classification level of "cameras" is the class classification level.

In some instances, the adaptive learning machine can identify another possible classification of the commodity. The other classification can be in a different classification level, e.g., the commodity classification level. For example, the adaptive learning machine can identify the classification "Digital Cameras" in the commodity classification level 308 in FIG. 3 as another classification of the commodity. The commodity can thus be classified as "Digital cameras" in the commodity classification level and "Cameras" in the class classification level. In some instances, the other classification can be a different classification. For example, if the adaptive learning machine determines that the numerical vector associated with the commodity lies at or near a boundary of the classification region, the adaptive learning machine can identify the classification of the adjacent classification region that shares the boundary as another possible classification of the commodity.

Figure 7:
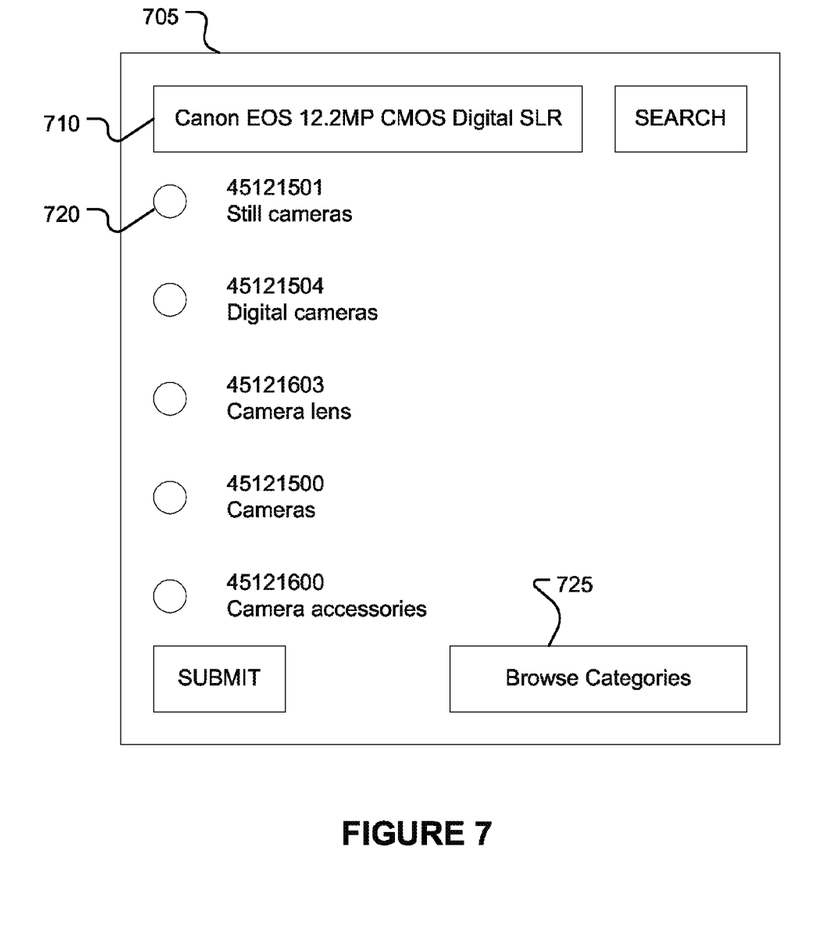
FIG. 7 illustrates an example interface of a client that displays classification categories in response to a query.

Referring again to FIG. 6, the adaptive learning machine transmits the classifications of the commodity for display at the client at step 610. FIG. 7 shows an example interface 705 of a client that displays the classifications. In FIG. 7, a user of the client has entered a query for "Canon EOS 12.2 MP CMOS Digital SLR" in the query box 710. After processing the query as described above, the adaptive learning machine transmits the classifications of the commodity to the client. The client displays the classifications received from the adaptive learning machine along with buttons 720 that the user can select to indicate that a classification is the correct classification. Once the user selects the correct classification, the client transmits the selection to the adaptive learning machine. If the adaptive learning machine did not identify the correct classification, the user can search for the correct classification by selecting the "Browse Categories" button 725 on the user interface. The client then displays a hierarchical list of classifications from which the user can select the correct classification.

Referring again to FIG. 6, the adaptive learning machine receives a selection of a classification of the commodity from the client at step 612. Based on the received selection of a classification, the adaptive learning machine updates the word matrix, the set of labeled terms, and/or the classification model at step 614. To update the word matrix, the adaptive learning machine creates nodes for each attribute of the commodity described by the query that did not match a term in the word matrix. The adaptive learning machine, for instance, may create a direct link between the nodes that contain the terms matching the attributes of the commodity, including the newly created nodes. To update the set of labeled terms, the adaptive learning machine labels each attribute with the selected classification and adds the labeled attribute to the set of labeled terms. To update the classification model, the adaptive learning machine modifies the decision surfaces that separate the vector space into different classifications so that the classification region corresponding to the correct classification includes the data point representing the numerical vector associated with the attributes of the commodity. When the adaptive learning machine receives a query at a later time describing a commodity that has one or more of the same attributes as the processed query, the adaptive learning machine will identify the selected classification based on the updated word matrix, the set of labeled terms, and the classification model.

A number of implementations have been described. Nevertheless, it will be understood that various modifications may be made. For example, other methods described herein besides or in addition to that illustrated in FIG. 2 may be performed. Further, the illustrated steps of method 200 may be performed in different orders, either concurrently or serially. Further, steps may be performed in addition to those illustrated in method 200, and some steps illustrated in method 200 may be omitted without deviating from the present disclosure. Accordingly, other implementations are within the scope of the following claims.

What is claimed is:

1. A method performed with a distributed computing system for classifying one or more commodities, the method comprising:
    receiving, at a local computing system, a query from a business enterprise computing system, the query comprising data associated with a business enterprise commodity, the data comprising one or more attributes of the business enterprise commodity;
    matching the one or more attributes of the business enterprise commodity with one or more terms of a plurality of terms in a word matrix, the word matrix comprising:
        a plurality of nodes that each comprise a term of the plurality of terms; and
        a plurality of links that each connect two or more nodes and define a similarity between the two or more nodes;
    generating, based on the matching, a numerical vector for the business enterprise commodity;
    identifying, based on the numerical vector, one or more classification regions that each define a classification of the business enterprise commodity; and
    preparing the classifications of the business enterprise commodity of the one or more identified classification regions for display at the business enterprise computing system.

2. The method of claim 1, further comprising:
    receiving a set of terms, each term of the set of terms is labeled with a correct classification;
    matching the one or more attributes of the business enterprise commodity with one or more terms of the set of terms;
    generating the numerical vector based on matching the one or more attributes of the business enterprise commodity with one or more terms of the plurality of terms in the word matrix and one or more terms of the set of terms;
    identifying one or more classifications of the business enterprise commodity based on the numerical vector; and
    preparing the one or more classifications of the business enterprise commodity for display at the business enterprise computing system.

3. The method of claim 1, further comprising:
    prior to receiving the query from the business enterprise computing system, building the word matrix.

4. The method of claim 3, wherein building the word matrix comprises:
    searching for content associated with a plurality of business enterprise commodities;
    parsing the content into the plurality of terms to define the plurality of nodes; and
    applying a semantic proximity model to the plurality of terms to define the plurality of links, wherein a link that connects two or more nodes defines a semantic similarity between the two or more nodes.

5. The method of claim 4, wherein building the word matrix further comprises:
    applying a string similarity model to map a term of the plurality of terms into a similar term, wherein a link that connects two or more nodes defines a string similarity between the two or more nodes.

6. The method of claim 1, wherein the classification is defined by a first classification level in a plurality of classification levels defined in a classification hierarchy.

7. The method of claim 6, wherein the plurality of classification levels comprise a segment classification level, a family classification level, a class classification level, a commodity classification level, and a business function classification level.

8. The method of claim 7, wherein the classification comprises the commodity classification level.

9. The method of claim 1, further comprising:
    transmitting the classifications of the business enterprise commodity of the one or more identified classification regions for display at the business enterprise computing system;
    receiving a selection of one of the classifications of the business enterprise commodity from the business enterprise computing system; and
    updating the word matrix based on the received selection.

10. The method of claim 9, wherein updating the word matrix based on the received selection comprises:
    creating a direct link between the nodes comprising terms matching the one or more attributes.

11. A computer storage medium encoded with a computer program, the program comprising instructions that when executed by one or more computers cause the one or more computers to perform operations comprising:
    receiving, at a local computing system, a query from a business enterprise computing system, the query comprising data associated with a business enterprise commodity, the data comprising one or more attributes of the business enterprise commodity;

matching the one or more attributes of the business enterprise commodity with one or more terms of a plurality of terms in a word matrix, the word matrix comprising:
- a plurality of nodes that each comprise a term of the plurality of terms; and
- a plurality of links that each connect two or more nodes and define a similarity between the two or more nodes;

generating, based on the matching, a numerical vector for the business enterprise commodity;

identifying, based on the numerical vector, one or more classification regions that each define a classification of the business enterprise commodity; and preparing the classifications of the business enterprise commodity of the one or more identified classification regions for display at the business enterprise computing system.

12. The computer storage medium of claim 11, wherein the operations further comprise:
  receiving a set of terms, each term of the set of terms is labeled with a correct classification;
  matching the one or more attributes of the business enterprise commodity with one or more terms of the set of terms;
  generating the numerical vector based on matching the one or more attributes of the business enterprise commodity with one or more terms of the plurality of terms in the word matrix and one or more terms of the set of terms;
  identifying one or more classifications of the business enterprise commodity based on the numerical vector; and
  preparing the one or more classifications of the business enterprise commodity for display at the business enterprise computing system.

13. The computer storage medium of claim 11, wherein the operations further comprise:
  prior to receiving the query from the business enterprise computing system, building the word matrix.

14. The computer storage medium of claim 13, wherein building the word matrix comprises:
  searching for content associated with a plurality of business enterprise commodities;
  parsing the content into the plurality of terms to define the plurality of nodes; and
  applying a semantic proximity model to the plurality of terms to define the plurality of links, wherein a link that connects two or more nodes defines a semantic similarity between the two or more nodes.

15. The computer storage medium of claim 14, wherein building the word matrix further comprises:
  applying a string similarity model to map a term of the plurality of terms into a similar term, wherein a link that connects two or more nodes defines a string similarity between the two or more nodes.

16. The computer storage medium of claim 11, wherein the operations further comprise:
  transmitting the classifications of the business enterprise commodity of the one or more identified classification regions for display at the business enterprise computing system;
  receiving a selection of one of the classifications of the business enterprise commodity from the business enterprise computing system; and
  updating the word matrix based on the received selection.

17. A system of one or more computers configured to perform operations comprising:
  receiving, at a local computing system, a query from a business enterprise computing system, the query comprising data associated with a business enterprise commodity, the data comprising one or more attributes of the business enterprise commodity;
  matching the one or more attributes of the business enterprise commodity with one or more terms of a plurality of terms in a word matrix, the word matrix comprising:
    a plurality of nodes that each comprise a term of the plurality of terms; and
    a plurality of links that each connect two or more nodes and define a similarity between the two or more nodes;
  generating, based on the matching, a numerical vector for the business enterprise commodity;
  identifying, based on the numerical vector, one or more classification regions that each define a classification of the business enterprise commodity; and
  preparing the classifications of the business enterprise commodity of the one or more identified classification regions for display at the business enterprise computing system.

18. The system of claim 17, further comprising:
  receiving a set of terms, each term of the set of terms is labeled with a correct classification;
  matching the one or more attributes of the business enterprise commodity with one or more terms of the set of terms;
  generating the numerical vector based on matching the one or more attributes of the business enterprise commodity with one or more terms of the plurality of terms in the word matrix and one or more terms of the set of terms;
  identifying one or more classifications of the business enterprise commodity based on the numerical vector; and
  preparing the one or more classifications of the business enterprise commodity for display at the business enterprise computing system.

19. The system of claim 17, further comprising:
  prior to receiving the query from the business enterprise computing system, searching for content associated with a plurality of business enterprise commodities;
  parsing the content into the plurality of terms to define the plurality of nodes; and
  applying a semantic proximity model to the plurality of terms to define the plurality of links, wherein a link that connects two or more nodes defines a semantic similarity between the two or more nodes.

20. The system of claim 17, further comprising:
  transmitting the classifications of the business enterprise commodity of the one or more identified classification regions for display at the business enterprise computing system;
  receiving a selection of one of the classifications of the business enterprise commodity from the business enterprise computing system; and
  updating the word matrix based on the received selection.

* * * * *